Figure 1:
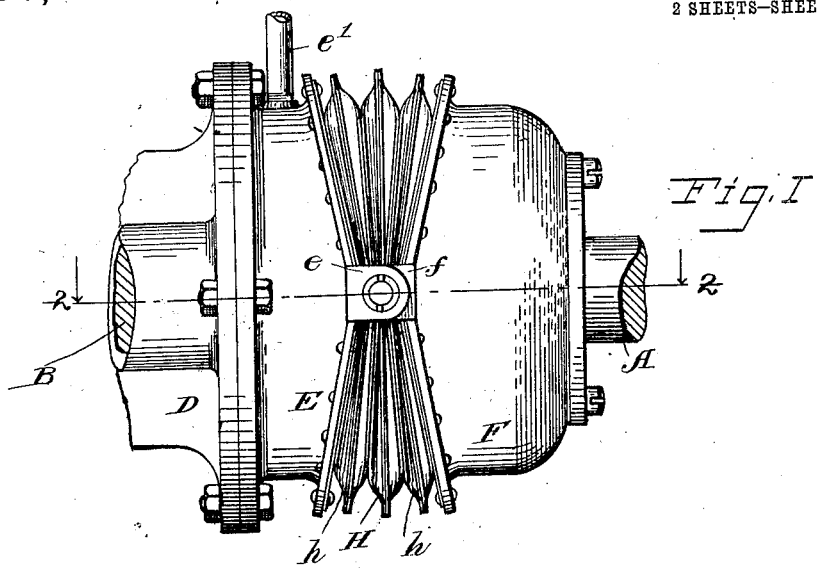

C. SCHMIDT.
UNIVERSAL JOINT CASING.
APPLICATION FILED FEB. 8, 1909.

1,097,368.

Patented May 19, 1914.
2 SHEETS—SHEET 1.

Witnesses.
J. C. Turner
A. L. Lord

Inventor.
Charles Schmidt
by Thurston Woodward
Attorneys

C. SCHMIDT.
UNIVERSAL JOINT CASING.
APPLICATION FILED FEB. 8, 1909.

1,097,360.

Patented May 19, 1914.
2 SHEETS—SHEET 2.

Witnesses:
J. C. Turner
A. L. Lord

Inventor:
Charles Schmidt
by Thurston Woodward
Attorneys

UNITED STATES PATENT OFFICE.

CHARLES SCHMIDT, OF CLEVELAND, OHIO, ASSIGNOR, BY MESNE ASSIGNMENTS, TO THE PEERLESS MOTOR CAR COMPANY, OF CLEVELAND, OHIO, A CORPORATION OF OHIO.

UNIVERSAL-JOINT CASING.

1,097,368.     Specification of Letters Patent.     Patented May 19, 1914.

Application filed February 8, 1909.   Serial No. 476,832.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Universal-Joint Casings, of which the following is a full, clear, and exact description.

The object of this invention is to cover a universal joint shaft coupling by means of a casing which will not only protect it from dirt, etc., but will also hold a suitable supply of lubricant and will not interfere with the necessary relative movement of the connected shafts. Such a casing or covering is particularly necessary for the universal joint which connects the two longitudinal members of the power transmission shaft on an automobile.

The invention in three forms thereof which the drawing shows has been organized with special reference for use in connection with an automobile and in the position referred to. It is to be understood, however, that the invention may be used in the described relation to any universal joint coupling.

The invention is shown in the accompanying drawings wherein—

Figure 2:
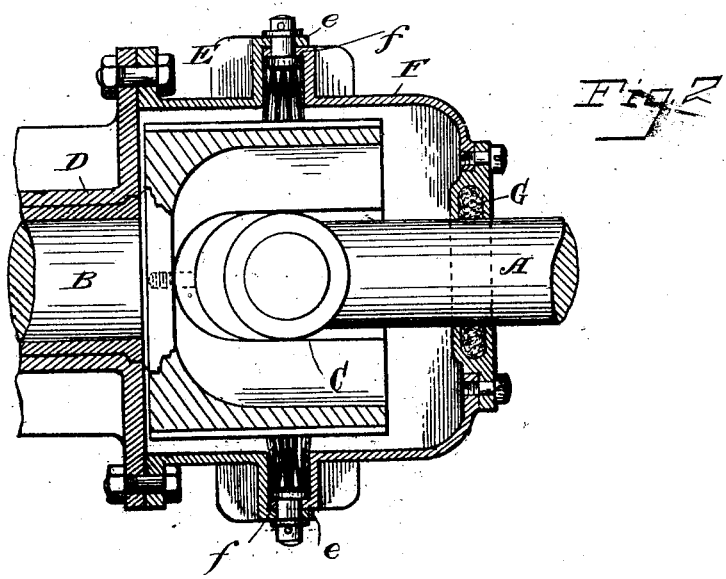
Figure 3:
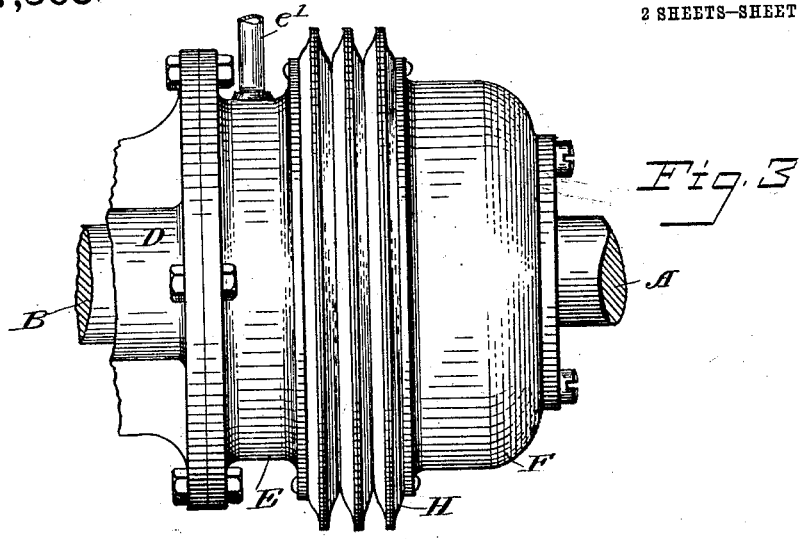
Figure 4:
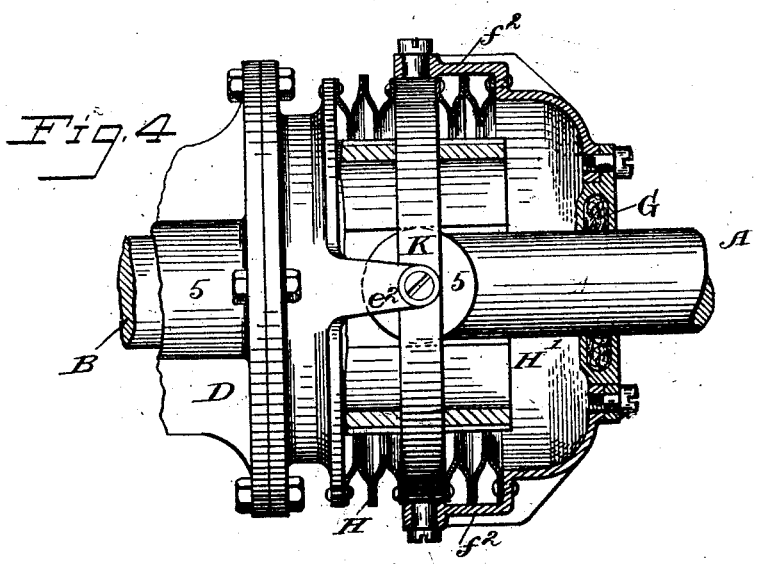
Figure 5:
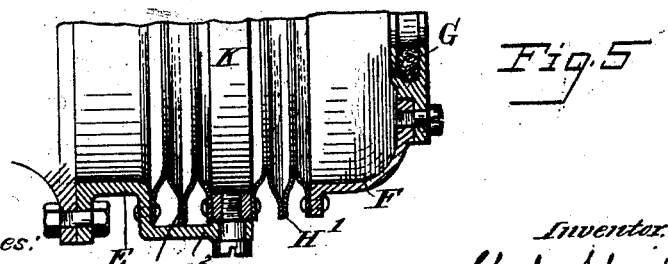

Figure 1 is a side elevation of the invention in its preferred embodiment. Fig. 2 is a horizontal longitudinal sectional view thereof. Fig. 3 is a side elevation of a modified and somewhat simplified construction embodying the invention. Fig. 4 is a side elevation partly in vertical section of another and somewhat more complicated form of the invention; and Fig. 5 is a longitudinal horizontal section through one side of the casing shown in Fig. 4.

Referring to the parts by letters, A and B represent two shaft sections which are connected by a universal joint coupling C of conventional or any suitable form. This precise coupling as shown includes a yoke $b$ fixed to shaft B and having two oppositely disposed longitudinal slots,—and arms $a$ projecting in diametrically opposite directions from shaft A into said slots. It will be understood, however, that this specific form of universal joint is not essential to the invention, which is adapted for use with any universal joint coupling.

Assume that the parts shown are parts of an automobile; then D will represent a portion of the differential gear casing in which the shaft B has a bearing, said gear casing being a part of the so-called rear axle structure. The part A of the shaft extends forward so that it may be suitably connected with the motor which is mounted on the automobile frame, which frame is, as is well understood, connected with the non-rotatable part of the rear axle structure by springs. It is the up and down movement of this rear axle structure relative to the frame which necessitates the provision of a universal joint connection between the two shaft sections.

The casing which covers and protects the universal joint consists of two metallic parts E and F. The former part is, or may be, rigidly fixed to the rear axle section or to the bearing for the shaft section B, whatever may be the specific form of that bearing. The other part F of the casing embraces the shaft section A and has an annular recess in its front end in which is a suitable packing, G, as, for example, a felt washer or the like which embraces the shaft section A. The two casing sections E and F are connected to the opposite ends of an interposed tubular bellows H, said bellows being composed of a plurality of rings $h$ preferably made of leather, and connected together by stitching or the like. This is the specific construction which is shown in Fig. 3. This is not thought to be the best form because there is nothing to restrain the casing section E from moving longitudinally forward upon shaft A and thereby stretching bellows out so that it cannot have, or, at least, cannot have freely, the required movement. In order to prevent this action the two casing sections E and F are severally provided with the two ears $e, e$, and $f, f$, lying at diametrically opposite points, which ears are pivoted together in the same axial horizontal line which passes through the center of the universal joint. As before stated when this device is used upon an automobile there is little relative movement of the two shafts except a movement about a horizontal axis. The casing section E moves with the shaft section B, when the casing section F, which embraces shaft A, partakes of the movement of the latter relative to the shaft section B. This movement is unrestrained because the two casing sections swing upon the axis which connects them, and the intermediate bellows section expands on one side and contracts on the other very freely so as to permit this motion.

This casing comprising the two sections E and F and the intermediate bellows sections is practically oil tight, and a sufficient quantity of a lubricant suitable for lubricating the universal joint may be put into this casing through any sort of filling hole, as, for example, that in which the pipe $e'$ is secured.

The form of the invention shown in Figs. 4 and 5 includes a ring K and two bellows sections, H and H', one connected with said ring and one with the casing section E, and the other connected with said ring and with the casing section F. This ring is hinged on a diametrical axis to ears $e^2$ on the section E, and is also hinged on a diametrical axis, at right angles to the first mentioned, to ears $f^2$ on the section F. This is a rather more expensive form of the device, but it has the advantage of preventing the bodily sidwise movement of the metallic sections relative to each other, and it also has the advantage of permitting the complete universal movement in all directions of the casing sections E and F.

Having described my invention, I claim:

1. A casing for universally coupled shafts comprising in combination a fixed casing section surrounding the end of one shaft, the said shaft being independently rotatable therein, a second casing section which embraces the other shaft and in which said last mentioned shaft is independently rotatable, means flexibly connecting the two casings whereby the second casing section may move with respect to the first casing section, but is held against rotation, and an intermediate flexible section surrounding the universal joint connecting the shafts, the said flexible casing being connected at its ends with the two casing sections above mentioned.

2. A casing for universally coupled shafts comprising in combination a fixed casing section which surrounds one shaft, the said shaft being independently rotatable in said casing, the said section being provided with an oil-tight joint surrounding the said shaft, a second casing which embraces the other shaft in which the said other shaft is independently rotatable, said second casing being provided with an oil-tight joint in which its shaft rotates, means for flexibly connecting the said casing sections whereby they may move with respect to each other, but the second section is held from rotation, and a flexible intermediate casing which is secured at its ends to the first mentioned casings.

3. A casing for universally coupled shafts comprising in combination a fixed casing section which surrounds one shaft, said shaft being independently rotatable therein, a second casing section which embraces the other shaft and in which the latter shaft is independently rotatable, means for flexibly connecting the said casing sections permitting movement between the same but preventing the second casing section from rotation, and an annular accordion bellows section which is connected at its ends with the two casing sections first mentioned.

4. A casing for universally coupled shafts comprising a metallic section which surrounds one shaft and is fixed to the bearing thereof, a second metallic section which embraces the other shaft and in which said shaft is freely rotatable, a packing being interposed between said shaft and section, the said two metallic sections having diametrically disposed ears which are pivoted together, and a flexible intermediate section which is respectively secured to the two metallic sections.

In testimony whereof, I hereunto affix my signature in the presence of two witnesses.

CHARLES SCHMIDT.

Witnesses:
H. R. SULLIVAN,
E. L. THURSTON.